(12) United States Patent
John et al.

(10) Patent No.: US 10,945,070 B2
(45) Date of Patent: Mar. 9, 2021

(54) UNMANNED AIRCRAFT, INFORMATION PROCESSING METHOD, AND RECORDING MEDIUM

(71) Applicant: Panasonic Intellectual Property Management Co., Ltd., Osaka (JP)

(72) Inventors: Stephen William John, Nara (JP); Kazunobu Konishi, Osaka (JP); Katsuhiko Asai, Nara (JP); Kazuo Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/511,518

(22) Filed: Jul. 15, 2019

(65) Prior Publication Data

US 2020/0084540 A1 Mar. 12, 2020

(30) Foreign Application Priority Data

Jul. 18, 2018 (JP) .............................. JP2018-135175

(51) Int. Cl.
*H04R 3/00* (2006.01)
*H04R 1/40* (2006.01)
(Continued)

(52) U.S. Cl.
CPC ........... *H04R 3/005* (2013.01); *B64C 39/024* (2013.01); *B64D 47/08* (2013.01); *G05D 1/101* (2013.01); *G10L 25/60* (2013.01); *H04N 5/2253* (2013.01); *H04R 1/406* (2013.01); *H04R 29/005* (2013.01); *B64C 2201/027* (2013.01); *B64C 2201/127* (2013.01); *B64C 2201/141* (2013.01); *B64C 2201/146* (2013.01); *B64C 2220/00* (2013.01); *H04R 2499/13* (2013.01)

(58) Field of Classification Search
CPC ...... H04R 3/005; H04R 1/406; H04R 29/005; H04R 2499/13; B64C 39/024; B64C 2201/027; B64C 2201/127; B64C 2201/141; B64C 2201/146; B64C 2220/00
See application file for complete search history.

(56) References Cited

U.S. PATENT DOCUMENTS

2016/0063987 A1 3/2016 Xu et al.
2016/0313743 A1 10/2016 Kim
2017/0220036 A1* 8/2017 Visser .................. G05D 1/0808

FOREIGN PATENT DOCUMENTS

JP 2007-158958 6/2007
JP 2017-502568 1/2017
WO 2016/029469 3/2016

* cited by examiner

*Primary Examiner* — David L Ton
(74) *Attorney, Agent, or Firm* — Wenderoth, Lind & Ponack, L.L.P.

(57) ABSTRACT

An unmanned aircraft includes: a sensor that includes at least a microphone that generates sound data; and a processor. The processor determines the quality of a target sound by use of the sound data generated by the microphone, identifies a sound source direction from the unmanned aircraft to the sound source of the target sound by use of data generated by the sensor, and controls an unmanned aircraft state that is a state of the unmanned aircraft such that a direction of a sound pickup area is aligned with the sound source direction, in accordance with the determined quality. The sound pickup area is a range in which sound pickup quality of the microphone is higher than that of another area.

10 Claims, 15 Drawing Sheets

(51) Int. Cl.
  *H04R 29/00*    (2006.01)
  *H04N 5/225*    (2006.01)
  *B64C 39/02*    (2006.01)
  *G10L 25/60*    (2013.01)
  *G05D 1/10*     (2006.01)
  *B64D 47/08*    (2006.01)

UNMANNED AIRCRAFT, INFORMATION PROCESSING METHOD, AND RECORDING MEDIUM

CROSS REFERENCE TO RELATED APPLICATION

This application claims the benefit of priority of Japanese Patent Application Number 2018-135175 filed on Jul. 18, 2018, the entire content of which is hereby incorporated by reference.

BACKGROUND

1. Technical Field

The present disclosure relates to an unmanned aircraft, an information processing method, and a recording medium.

2. Description of the Related Art

Japanese Unexamined Patent Application Publication No. 2017-502568 (Patent Literature 1: PTL 1) discloses an unmanned aerial vehicle that performs a process of removing background noise generated by the unmanned aerial vehicle from sound data picked up by a microphone in order to isolate a desired sound signal.

SUMMARY

When the background noise is louder than the other sounds, the technology disclosed in PTL 1 may reduce the resulting quality of the desired sounds obtained by the process of removing the background noise.

In view of the above, the present disclosure aims to provide an unmanned aircraft, an information processing method, and a recording medium that are capable of enhancing the quality of the target sound.

The unmanned aircraft according to the present disclosure includes: a sensor that includes at least a microphone that generates sound data; and a processor. In this unmanned aircraft, the processor determines the quality of a target sound by use of the sound data generated by the microphone, identifies the sound source direction from the unmanned aircraft to the sound source of the target sound by use of data generated by the sensor, and controls an unmanned aircraft state that is a state of the unmanned aircraft such that a direction of a sound pickup area is aligned with the sound source direction, in accordance with the determined quality. The sound pickup area is a range in which sound pickup quality of the microphone is higher than that of another area.

Note that these general or specific aspects may be implemented as a system, a method, an integrated circuit, a computer program, or a computer readable recording medium such as a CD-ROM, or may be implemented as any combination of a system, a method, an integrated circuit, a computer program, and a recording medium.

The unmanned aircraft, the information processing method, and the recording medium according to the present disclosure allow high quality sound to be recorded by the unmanned aircraft.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
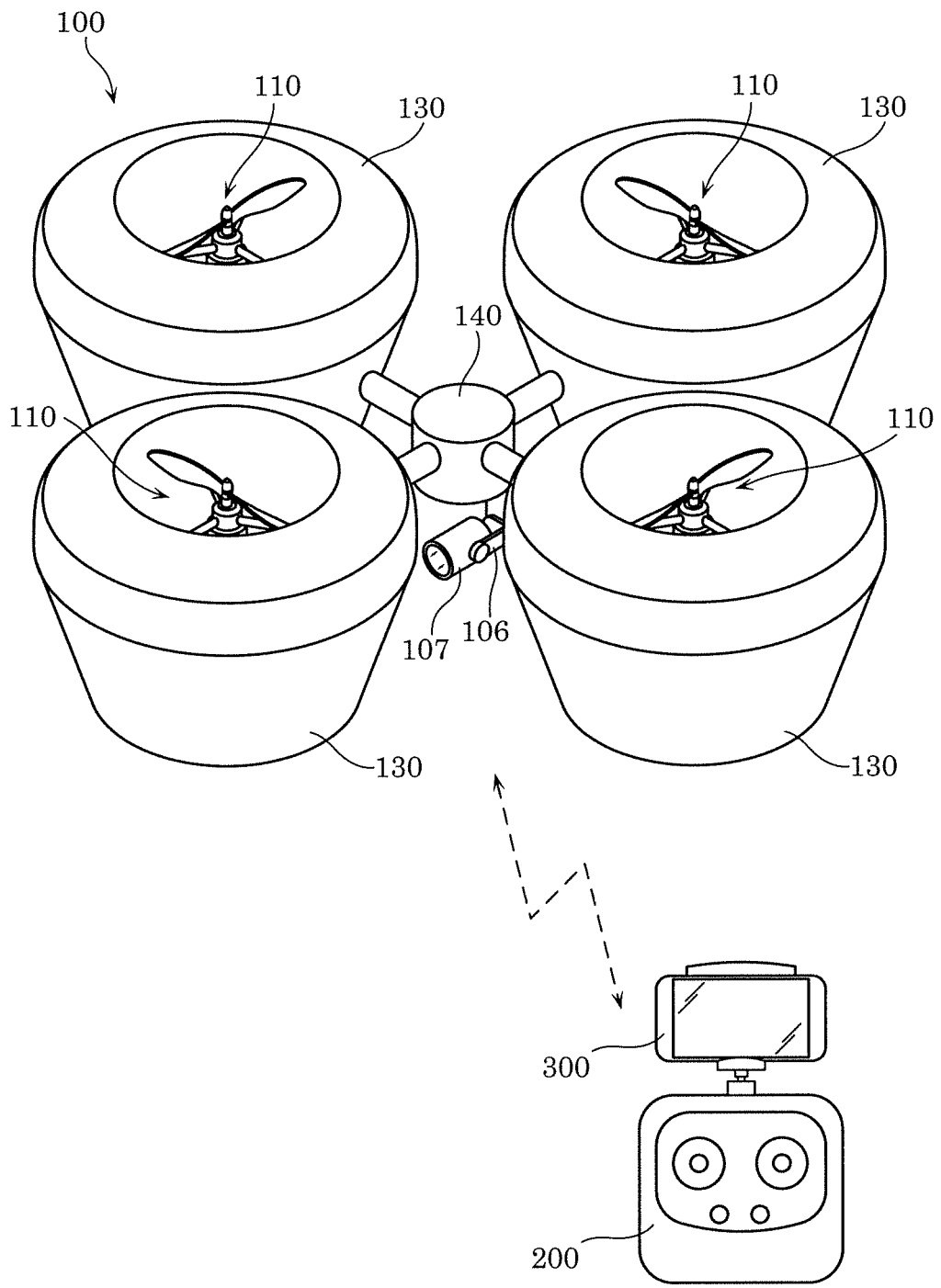
FIG. 1 shows external views of an unmanned aircraft and a controller according to an embodiment of the present disclosure.

Findings that Forms Basis of the Present Disclosure

The unmanned aerial vehicle disclosed in PTL 1 fails to consider a relative positional relationship between the unmanned aerial vehicle and the sound source from which sound data is to be picked up. This may cause the sound source not to be included in a sound pickup area of a microphone included in the unmanned aerial vehicle. When the sound source is not included in the sound pickup area of the microphone as in this case, the microphone cannot effectively pick up the target sound, and consequently picks up a relatively larger amount of background noise. This results in a relatively larger noise component of the sound data picked up by the microphone, and thus in a smaller signal-to-noise (SN) ratio. For this reason, it is difficult to obtain high-quality sound data even by processing the obtained sound data to remove the background noise.

In order to solve the above concerns, the unmanned aircraft according to one aspect of the present disclosure is an unmanned aircraft, including: a sensor that includes at least a microphone that generates sound data; and a processor. In the unmanned aircraft, the processor determines the quality of a target sound by use of the sound data generated by the microphone, identifies the sound source direction from the unmanned aircraft to the sound source of the target sound by use of data generated by the sensor, and controls an unmanned aircraft state that is a state of the unmanned aircraft such that a direction of a sound pickup area is aligned with the sound source direction, in accordance with the determined quality. Unmanned aircraft state includes, but is not limited to, position or altitude. The sound pickup area is a range in which sound pickup quality of the microphone is higher than that of another area.

In this configuration, the processor controls the unmanned aircraft state in order to include the sound source direction within the sound pickup area, such that the sound quality of the target sound recorded by microphone is higher than that of another sound pickup area. This configuration thus achieves a relatively larger component of the target sound of the sound data generated by the microphone, and enhances the quality of the target sound.

The processor may control the unmanned aircraft state such that the change in the unmanned aircraft states is minimized. Changes to the aircraft state that require the increase in rotation speed of at least one propeller result in increased background noise levels. The processor may also vary the level of change in the unmanned aircraft state in order to perform the sound recording.

This configuration controls the unmanned aircraft state with the least possible amount of change, and thus reduces the noise from the unmanned aircraft caused by the control of the aircraft state. For example, when the change in the unmanned aircraft state is minimized, such as performing the shortest possible maneuver, the above configuration minimizes the length of time required to change the rotational speeds of the rotor blades included in the unmanned aircraft, or the amount of change required to change the rotational speeds of the rotor blades. This configuration is thus capable of reducing the noise that is produced until when the sound source is included within the sound pickup area in which the sound pickup quality of the microphone is higher than that of another area. Also, a minimized change in the rotational speeds achieves a smaller change in noise characteristics. Consequently, the accuracy of noise removal processing is improved. That the noise is hard to be picked up and easy to be removed results in an enhanced quality of the target sound.

In one configuration, the processor may also control the unmanned aircraft state such that noise from the unmanned aircraft due to the change is minimized.

This configuration changes the aircraft state of the unmanned aircraft to reduce the noise, and thus reduces the noise that is produced until when the sound source is included within the sound pickup area in which the sound pickup quality of the microphone is higher than that of another area. This configuration thus enhances the quality of the target sound.

The processor may also identify the sound source direction by use of the sound data generated by the microphone.

This configuration enables the unmanned aircraft to identify the sound source direction only by being equipped with a microphone as a sensor.

The sensor may further include an image sensor that generates image data, and the processor may identify the sound source direction by use of the image data generated by the image sensor.

This configuration enables the unmanned aircraft to identify the sound source direction without being affected by the surrounding noise.

The processor may modify the unmanned aircraft state when the determined quality is lower than a threshold.

This configuration improves the quality of the target sound when the quality of the obtained target sound is low.

The processor may maintain the unmanned aircraft state when the determined quality is higher than a threshold.

In this configuration, the processor does not change the aircraft state of the unmanned aircraft when the quality of the target sound is sufficiently high, and thus prevents the reduction in the quality of the target sound caused by the noise that is produced due to the change in the unmanned aircraft state or by the change in the noise characteristics.

The unmanned aircraft according to another aspect of the present disclosure is an unmanned aircraft, including: a sensor that includes at least a microphone that generates sound data, and an image sensor; and a processor. In the unmanned aircraft, the processor may determine the quality of a target sound by use of the sound data generated by the microphone, and control an unmanned aircraft state that is a state of the unmanned aircraft such that a direction of a sound pickup area is aligned with an imaging direction of the image sensor, in accordance with the determined quality. Unmanned aircraft state includes, but is not limited to, position or altitude. The sound pickup area is a range in which sound pickup quality of the microphone is higher than that of another area.

In this configuration, the processor controls the aircraft state of the unmanned aircraft in order to include the imaging direction within the sound pickup area in which the sound pickup quality of the microphone is higher than that of another area. Here, in many cases, the imaging direction is in the direction in which the sound source of the target sound is located. This configuration thus achieves a relatively larger component of the target sound of the sound data generated by the microphone, and enhances the quality of the target sound.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following specifically describes the unmanned aircraft according to one aspect of the present disclosure with reference to the drawings.

Note that the following embodiment is a specific example of the present disclosure. The numerical values, shapes, materials, structural components, the arrangement and connection of the structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts of the present disclosure will be described as optional structural components.

Embodiment

The following describes the embodiment with reference to FIG. 1 through FIG. 12B.

1. Configuration

Figure 2:
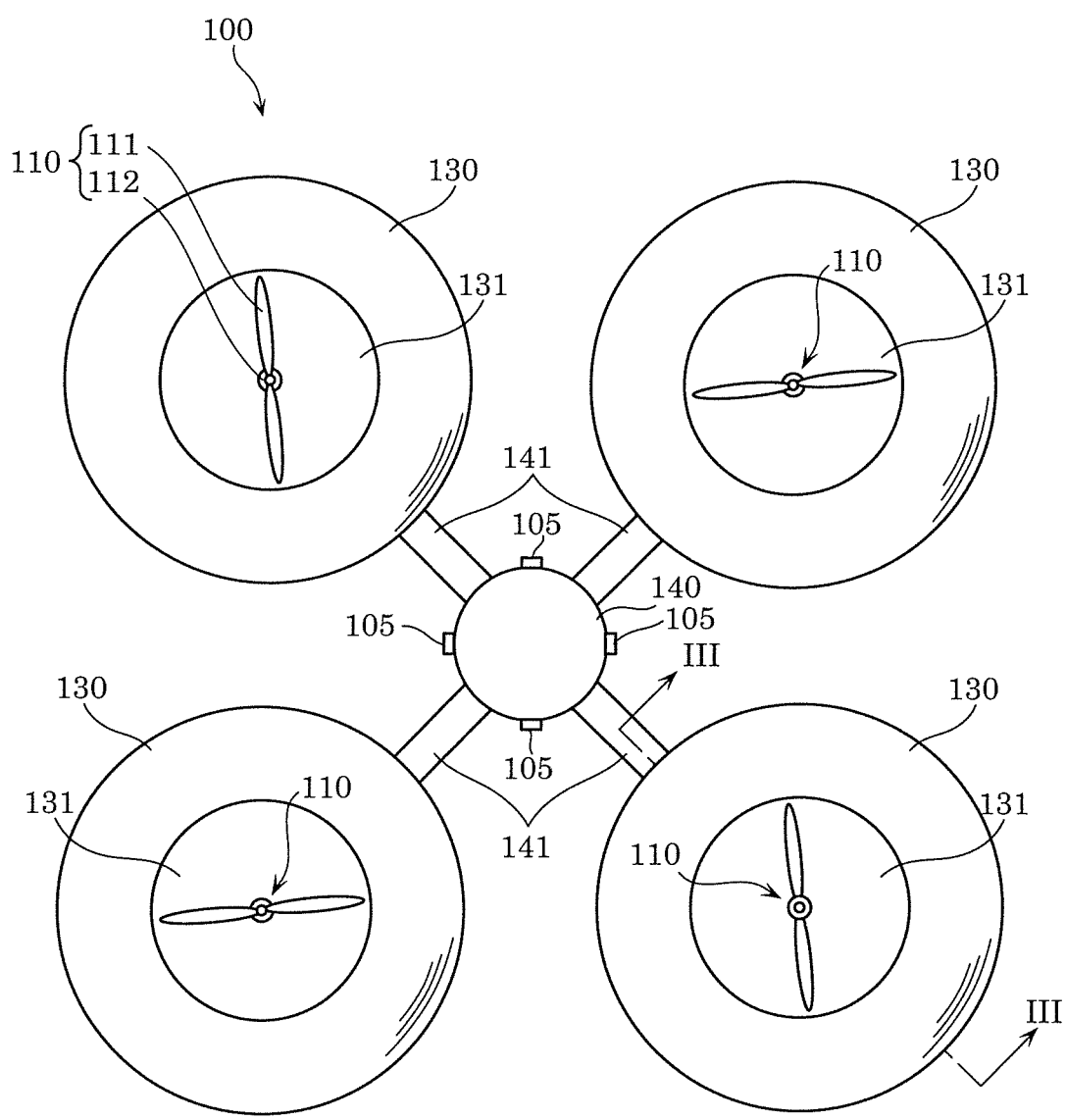
FIG. 2 is a plan view of the unmanned aircraft according to an embodiment of the present disclosure in a top view.

FIG. 1 shows external views of an unmanned aircraft and a controller according to the embodiment. FIG. 2 is a plan view of the unmanned aircraft according to the embodiment in a top view.

As shown in FIG. 1, unmanned aircraft 100 receives from controller 200 an operation signal that is in accordance with a user operation to controller 200, and flies in accordance with the received operation signal. Unmanned aircraft 100 may perform imaging mid-flight by use of camera 107 included in unmanned aircraft 100 in accordance with the received operation signal. The image data captured by camera 107 may be sent to mobile terminal 300 to be described later.

Controller 200 accepts an operation from the user, and sends to unmanned aircraft 100 an operation signal that is in accordance with the accepted operation. Controller 200 may hold mobile terminal 300 such as a smartphone with a display.

Mobile terminal 300 receives from unmanned aircraft 100 the image data captured by camera 107 of unmanned aircraft 100, and displays, for example, the received image data in real time.

This enables the user to operate controller 200 while checking on mobile terminal 300 the image data captured by camera 107 of unmanned aircraft 100 in real time, thereby changing the aircraft state of unmanned aircraft 100 that is at least one of the in-flight position and attitude of unmanned aircraft 100. The user thus can freely change the range of imaging by camera 107 of unmanned aircraft 100.

Unmanned aircraft 100 includes four generators 110, four ducts 130, main body 140, and four arms 141.

Each of four generators 110 generates thrust to fly unmanned aircraft 100. More specifically, each of four generators 110 produces an airflow to generate thrust to fly unmanned aircraft 100. Each of four generators 110 includes rotor blade 111 that rotates to produce an airflow, and actuator 112 that rotates rotor blade 111. Each rotor blade 111 and actuator 112 include an axis of rotation that is substantially parallel in the vertical direction to produce an airflow that flows downward from above. This configuration enables four generators 110 to produce thrust that levitates unmanned aircraft 100 upward, allowing unmanned aircraft 100 to fly. Each actuator 112 is, for example, a motor.

In a top view, four generators 110 are arranged around main body 140 at 90 degree intervals. Stated differently, four generators 110 are arranged in a circular form to surround main body 140.

Note that rotor blade 111 included in each of four generators 110 is illustrated to be formed by a single propeller as a non-limited example, and thus rotor blade 111 may be formed by a counter-rotating propeller that includes two propellers that rotate in counter directions about the same axis of rotation. The propeller may also have more than two blades.

Figure 3:
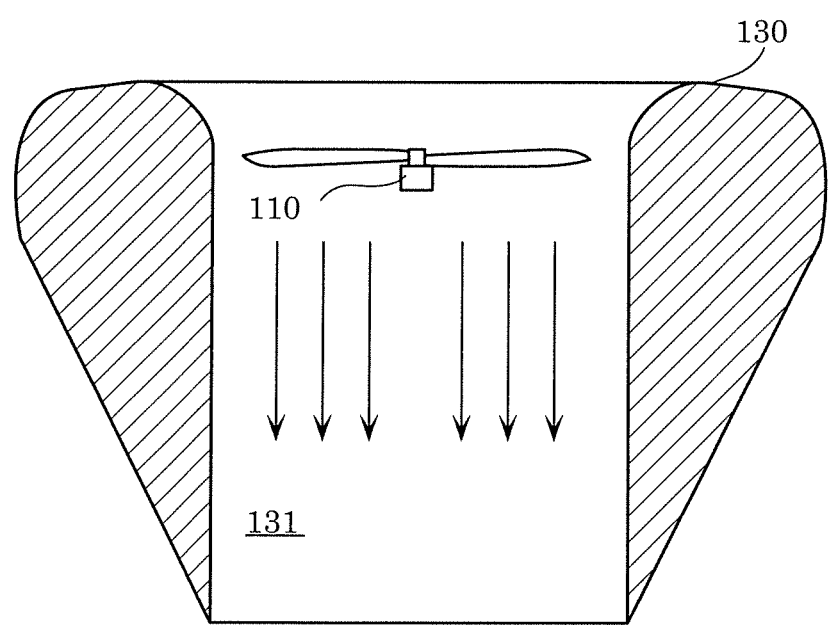
FIG. 3 is a cross-sectional view of the unmanned aircraft taken at line in FIG. 2.

FIG. 3 is a cross-sectional view of the unmanned aircraft taken at line III-III in FIG. 2. Stated differently, FIG. 3 is a cross-sectional view of a single generator 110 and its corresponding duct 130 cut along a plane that runs through the axis of rotation of rotor blade 111.

One duct 130 is provided to each generator 110, with the axis of rotation of the generator substantially parallel and in-line with the axis of duct 130 internal open volume. Each of four ducts 130 is arranged to laterally cover the corresponding generator 110. Stated differently, each of four ducts 130 is arranged to cover the corresponding generator 110 in a direction that is substantially orthogonal to the direction of the axis of rotation of rotor blade 111 of the corresponding generator 110. For example, each of four ducts 130 laterally covers the corresponding generator 110 along the length in the direction of the axis of rotation of such generator 110. Stated differently, each of four ducts 130 has space 131 in which the corresponding generator 110 is arranged, and which has the shape of a circular cylinder that vertically passes through duct 130. Each of four ducts 130 has a shape that tapers in thickness toward the downstream side of an airflow produced by the corresponding generator 110. More specifically, each of four ducts 130 has a shape in which the outer surface of duct 130 is nearer to the inner surface of such duct 130 in a circular cylindrical shape toward the downstream side of an airflow produced by the corresponding generator 110. Stated differently, each of four ducts 130 has a pointed shape at its downstream side of an airflow produced by the corresponding generator 110. Also, the inner surface of each duct 130 has a rounded end portion at its upstream side of an airflow. More specifically, such end portion has a shape in which the inner diameter of duct 130 tapers in the flow direction of an airflow. This shape facilitates the flow of the air into duct 130, and thus improves the flight performance. This also achieves the weight reduction of ducts 130, and further the lightening of unmanned aircraft 100. Note that such end portion may have a linear shape that extends along the flow direction of an airflow.

An example of main body 140 is a boxy member in a circular cylindrical shape, i.e., a cabinet. Electrical components such as a processor, a memory, a battery, and various sensors are arranged inside main body 140. Note that the shape of the member of main body 140 is not limited to a circular cylindrical shape, and thus may be another boxy shape such as a quadrangular prism. Main body 140 also includes four microphones 105, gimbal 106, and camera 107 on the outer surface. Each of four microphones 105 is arranged, for example, at a position on main body 140 in between two adjacent generators 110 of four generators 110. Stated differently, four microphones 105 are arranged about main body 140 at positions that are 45 degrees off from each other with respect to the direction that faces four generators 110.

Four arms 141 are members that connect the respective four ducts 130 with main body 140. Each of four arms 141 has one end fixed to main body 140, and the other end fixed to the corresponding one of four ducts 130.

Figure 4:
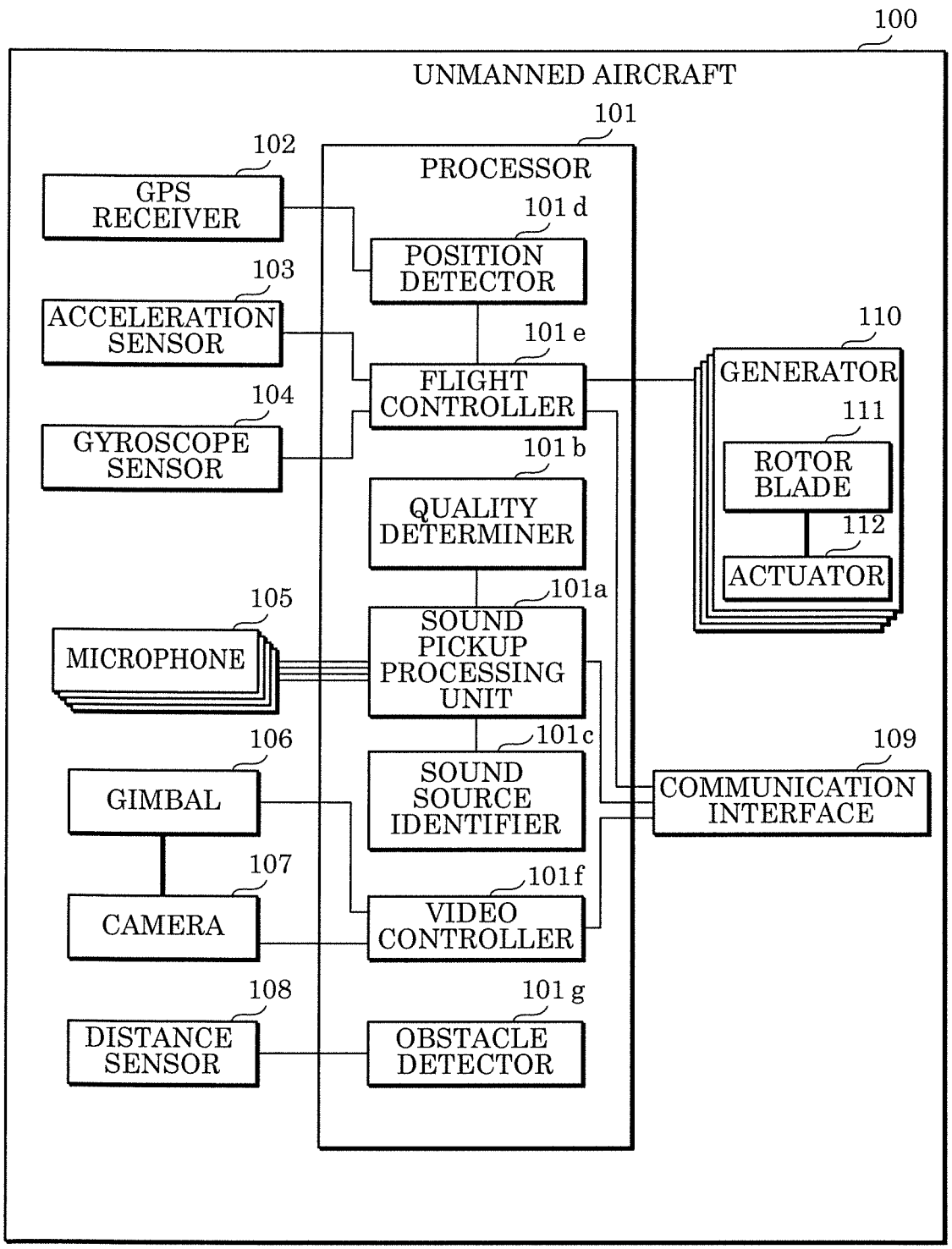
FIG. 4 is a block diagram of the configuration of the unmanned aircraft according to an embodiment of the present disclosure.

FIG. 4 is a block diagram of the configuration of the unmanned aircraft according to the embodiment. More specifically, FIG. 4 is a block diagram that illustrates the function of processor 101 that is implemented by use of the hardware configuration of unmanned aircraft 100.

As shown in FIG. 4, unmanned aircraft 100 includes processor 101, global positioning system (GPS) receiver 102, acceleration sensor 103, gyroscope sensor 104, four microphones 105, gimbal 106, camera 107, distance sensor 108, communication IF 109, and four generators 110.

Processor 101 obtains results such as: detection results from various sensors such as acceleration sensor 103, gyroscope sensor 104, four microphones 105, an image sensor of camera 107, and distance sensor 108; a reception result from GPS receiver 102 or communication IF 109; and others. Processor 101 executes various processes on the obtained detection results or the reception result by executing a predetermined program stored in a non-illustrated memory or storage, thereby controlling at least one of: four generators 110; gimbal 106; and camera 107.

GPS receiver 102 receives information indicating the position of GPS receiver 102 from satellites including a GPS satellite. Stated differently, GPS receiver 102 detects the current position of unmanned aircraft 100.

Acceleration sensor 103 is a sensor that detects accelerations in three different directions of unmanned aircraft 100.

Gyroscope sensor 104 is a sensor that detects an angular rate of rotation about each of the three axes in the three different directions of unmanned aircraft 100.

Each of four microphones 105 is a microphone, and an example of the sensors. Each of four microphones 105 has directionality that enables the pickup of sounds, in a sound pickup area of microphone 105, having higher sound quality than the quality of sounds in an angular range other than such sound pickup area. Here, the sound pickup area is a predetermined angular range that is defined with respect to a specified direction. The predetermined angular range is, for example, an angular range of 90 degrees or less, and a three-dimensional angular range that expands with respect to the position of each microphone 105. Each of four microphones 105 may be a microphone array having a plurality of microphone elements. Each of four microphones 105 picks up sound to generate sound data, and outputs the generated sound data.

Gimbal 106 is a device for maintaining a constant attitude of camera 107 in the three-axis directions. Stated differently, gimbal 106 is a device for maintaining a desired attitude of camera 107 relative to the terrestrial coordinate system, for example, even when the attitude of unmanned aircraft 100 changes. Here, the desired attitude is an attitude that is defined by an imaging direction of camera 107 indicated by an operation signal received from controller 200.

Camera 107, which is an example of the sensors, is a device having an image sensor, and an optical system such as a lens.

Distance sensor 108 is a sensor that detects the distance from distance sensor 108 to an object around. Examples of distance sensor 108 include an ultrasonic sensor, a time of flight (TOF) camera, and a light detection and ranging (LIDAR).

Communication IF 109 is intended for communication with controller 200 or mobile terminal 300. Communication IF 109 includes, for example, a communication interface for receiving a transmission signal from controller 200. Communication IF 109 may also be a communication interface for wireless communication with mobile terminal 300. Stated differently, communication IF 109 may be a wireless local area network (LAN) interface compliant with, for example, the IEEE802.11a,b,g,n, and ac standards.

Four generators 110 have been described above, and thus will not be described here.

Functional components included in processor 101 are sound pickup processing unit 101a, quality determiner 101b, sound source identifier 101c, position detector 101d, flight controller 101e, video controller 101f, and obstacle detector 101g.

Sound pickup processing unit 101a obtains the sound data generated by each of four microphones 105 by picking up sounds. Sound pickup processing unit 101a may perform signal conversion to convert digital microphone signal into an analog waveform. Sound pickup processing unit 101a may perform on the obtained sound data a predetermined sound process of filtering a sound component in a predetermined frequency range to reduce noise included in the sound data. The sound component in the predetermined frequency range is, for example, a sound component in a frequency range of noise produced by the rotation of each rotor blade 111 of the corresponding generator 110.

Quality determiner 101b uses the sound data generated by each of four microphones 105 to determine the quality of the target sound included in the sound data. More specifically, quality determiner 101b determines the SN ratio of the target sound to determine the quality of such target sound. For example, quality determiner 101b determines whether the SN ratio, which is an example quality, is greater than a threshold. When the SN ratio is greater than the threshold, quality determiner 101b determines that the quality is high, whereas when the SN ratio is less than the threshold, quality determiner 101b determines that the quality is low. The SN ratio is calculated, for example, by first determining the sound level in decibels of the microphone signal with only the unmanned aircraft sound prior to noise reduction sound filtering, calculating the sound level of a target sound recorded by the microphone after noise reduction, also in decibels, and then calculating the difference between the two as the SN ratio.

Sound source identifier 101c uses the sound data generated by each of four microphones 105 to identify the sound source direction, which is a direction to the sound source of the target sound from unmanned aircraft 100. Sound source identifier 101c may compare the four pieces of sound data obtained from four microphones 105 to identify as the sound source direction a direction in which the sound pressure of the target sound is estimated to be high. Sound source identifier 101c may also compare the time of arrival at the four microphones and the physical arrangement of the four microphones to identify the sound source direction. Sound source identifier 101c may also compare pieces of data, which are included in each piece of the sound data obtained from each of four microphones 105 and which are obtained from a plurality of microphone elements included in each of four microphones 105. Through this process, sound source identifier 101c identifies as the sound source direction a direction in which the sound pressure of the target sound is estimated to be high.

Alternatively, sound source identifier 101c may use the image data generated by the image sensor of camera 107 to identify the sound source direction, which is a direction to the sound source of the target sound from unmanned aircraft 100. In this case, sound source identifier 101c may recognize, through an image process on the image data, the color, shape, type, or other feature of the sound source that have been previously determined, thereby identifying the sound source direction, or estimating the distance to the sound source. When the sound source direction has been identified, sound source identifier 101c may use distance sensor 108 to detect the distance to the object in the sound source direction, thereby estimating the distance to the sound source. Sound source identifier 101c may obtain the volume of the target sound emitted from the sound source to compare the sound pressure of the target sound included in the sound data generated by each of four microphones 105 with the obtained volume of the target sound, thereby estimating the distance to the sound source. In this case, the volume of the target sound emitted from the sound source may be a predetermined volume. Alternatively, sound source identifier 101c may obtain position information on the sound source position from the sound source to identify the sound source direction or the distance to the sound source.

The sound source may be, for example, a person, a speaker, or a vehicle.

Position detector 101d obtains the detection result from GPS receiver 102 to detect the current position of unmanned aircraft 100. The GPS receiver 102 may optionally include a compass sensor.

Flight controller 101e controls the rotational speed of actuator 112 of each generator 110, thereby controlling the unmanned aircraft 100 state in accordance with: the current position of unmanned aircraft 100 detected by position detector 101d; the flight speed and flight attitude of unmanned aircraft 100 obtained from the detection results of acceleration sensor 103 and gyroscope sensor 104; and the operation signal from controller 200 received by communication IF 109. Stated differently, flight controller 101e performs normal control of controlling the aircraft state of unmanned aircraft 100 in accordance with a user operation to controller 200.

In addition to the normal control, flight controller 101e may perform sound recording control of controlling the aircraft state of unmanned aircraft 100 in order to include the sound source direction identified by sound source identifier 101c within the sound pickup area of at least one of four microphones 105, in accordance with the determination result of quality determiner 101b. When quality determiner 101b determines that the quality is low, for example, flight controller 101e changes the aircraft state of unmanned aircraft 100 in the control of the aircraft state in the sound recording control. When quality determiner 101b determines that the quality is high, for example, flight controller 101e maintains the aircraft state of unmanned aircraft 100 in the control of the aircraft state in the sound recording control.

When changing the aircraft state of unmanned aircraft 100 in the sound recording control, flight controller 101e may control the aircraft state of unmanned aircraft 100 such that the change in unmanned aircraft states is minimized. In this case, flight controller 101e may control the aircraft state of unmanned aircraft 100 such that the noise from the unmanned aircraft due to the change is minimized.

More specifically, flight controller 101e performs control of rotating unmanned aircraft 100 about main body 140 of unmanned aircraft 100 serving as the central axis in order to include the identified sound source direction within the sound pickup area closest to such sound source direction among the four sound pickup areas of four microphones 105.

Stated differently, the above sound recording control changes the attitude of unmanned aircraft 100 by rotating unmanned aircraft 100 with the minimum amount of change, thereby minimizing the period of time required to change the rotational speeds of rotor blades 111 of unmanned aircraft 100 or the amount of change required to change the rotational speeds of rotor blades 111. This thus reduces the noise from generators 110 that is produced until when the inclusion of the sound source direction within the sound pickup area of the corresponding microphone 105 completes.

Note that information indicating the positions of the sound pickup areas of the respective four microphones 105 relative to unmanned aircraft 100 is previously stored in a non-illustrated memory included in unmanned aircraft 100. This enables quality determiner 101b, which determines an amount of change by which flight controller 101e rotates unmanned aircraft 100 to change the attitude of unmanned aircraft 100, to determine an amount of change indicating the extent required to rotate unmanned aircraft 100 to include the sound source direction within the sound pickup area, on the basis of the information on the sound pickup areas read from the memory, and the attitude of unmanned aircraft 100 obtained, for example, from the various sensors such as acceleration sensor 103 and gyroscope sensor 104.

Note that flight controller 101e may perform the sound recording control in the case where four microphones 105 record the target sound. For example, flight controller 101e may stop the normal control to start the sound recording control when four microphones 105 start recording the target sound, and may stop the sound recording control to start the normal control when four microphones 105 finish recording the target sound.

The sound recording control may be performed in the case where four microphones 105 record the target sound. Stated differently, the sound recording control may be control of recording only the target sound or may be control of recording the target sound together with capturing images by camera 107.

Video controller 101f controls gimbal 106 in accordance with the operation signal received by communication IF 109 in order to orient the imaging direction of camera 107 to face the direction indicated by the operation signal, thereby controlling the attitude of camera 107. Video controller 101f may also perform a predetermined image process on the image data captured by camera 107. Video controller 101f may transmit the image data obtained from camera 107 or image data that has undergone the predetermined image process to mobile terminal 300 via communication IF 109.

Obstacle detector 101g detects an obstacle around unmanned aircraft 100 in accordance with the distance, detected by distance sensor 108, from unmanned aircraft 100 to the object. Obstacle detector 101g may exchange information with flight controller 101e, thereby detecting an obstacle located at a destination to which unmanned aircraft 100 is to travel. When detecting an object at the destination to which unmanned aircraft 100 is to travel, obstacle detector 101g may instruct flight controller 101e to cause unmanned aircraft 100 to avoid the obstacle to travel.

2. Operation

The following describes the operation performed by unmanned aircraft 100 according to the embodiment.

Figure 5:
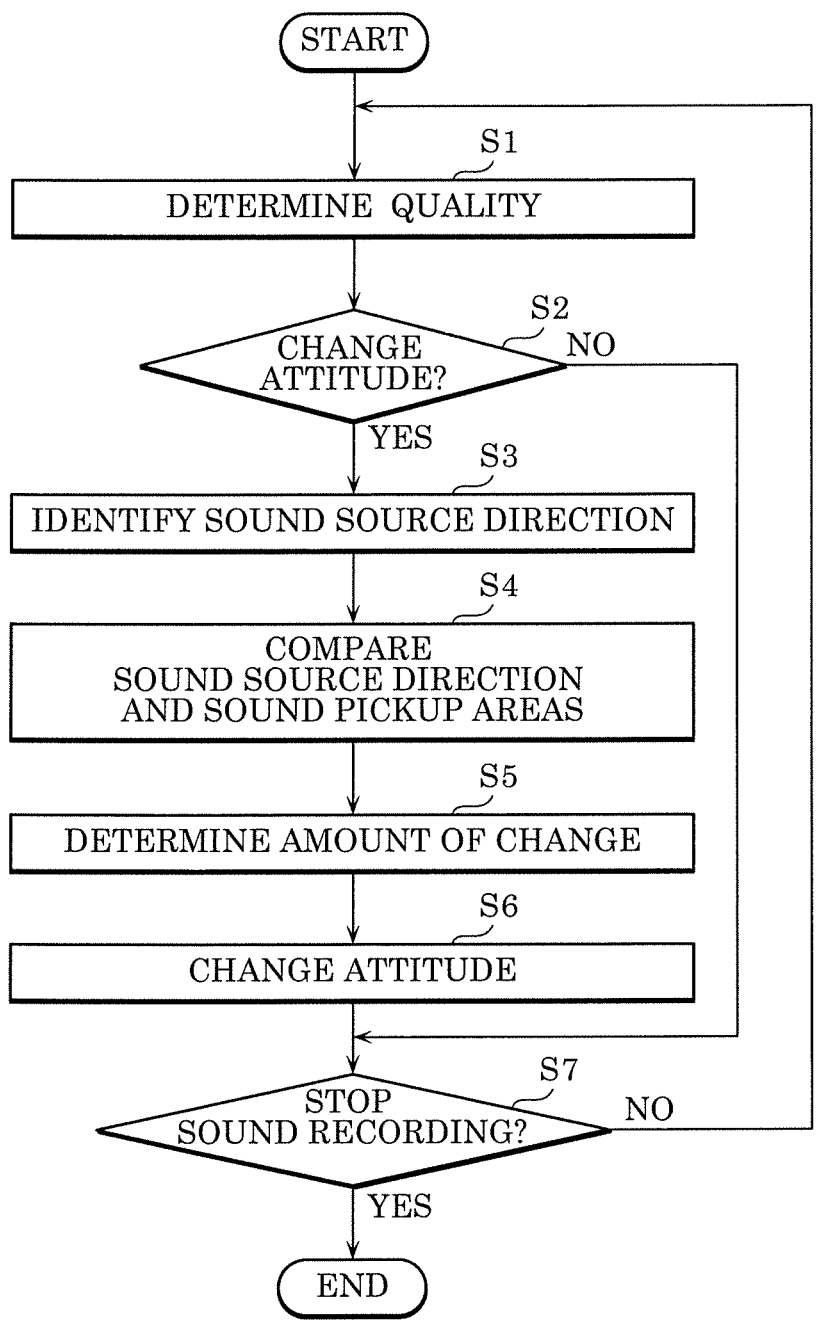
FIG. 5 is a flowchart of a first exemplary operation in sound recording control performed by the unmanned aircraft according to an embodiment of the present disclosure.
Figure 6A:
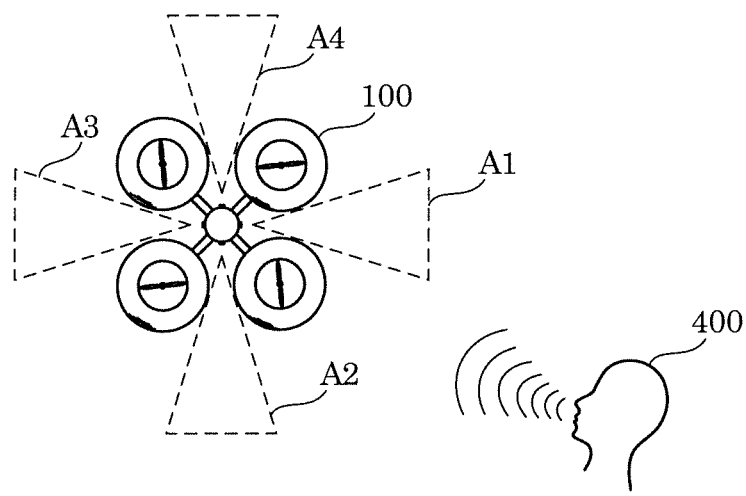
FIG. 6A is a diagram that illustrates a first scene in the first exemplary operation in the sound recording control performed by the unmanned aircraft according to an embodiment of the present disclosure.
Figure 6B:
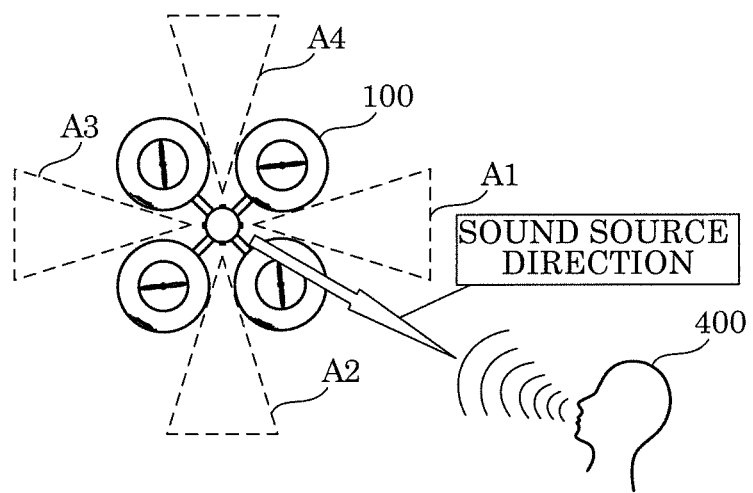
FIG. 6B is a diagram that illustrates a second scene in the first exemplary operation in the sound recording control performed by the unmanned aircraft according to an embodiment of the present disclosure.
Figure 6C:
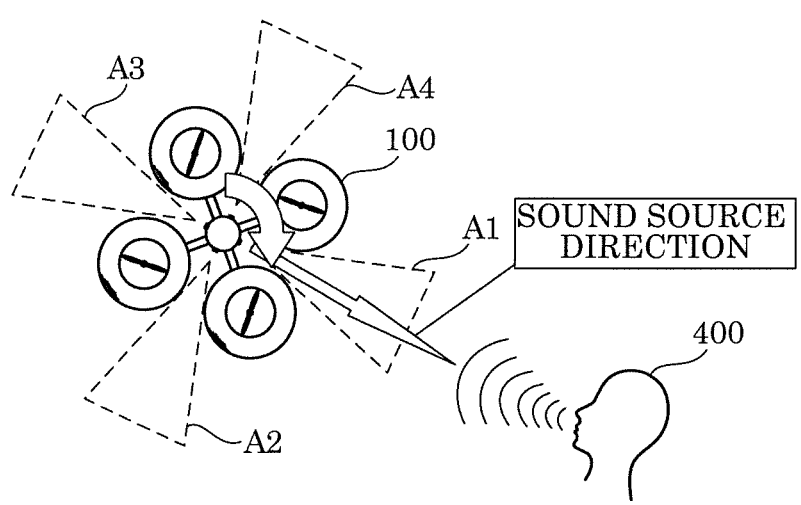
FIG. 6C is a diagram that illustrates a third scene in the first exemplary operation in the sound recording control performed by the unmanned aircraft according to an embodiment of the present disclosure.

FIG. 5 is a flowchart of a first exemplary operation in sound recording control performed by the unmanned aircraft according to the embodiment. FIG. 6A is a diagram that illustrates a first scene in the first exemplary operation in the sound recording control performed by the unmanned aircraft according to the embodiment. FIG. 6B is a diagram that illustrates a second scene in the first exemplary operation in the sound recording control performed by the unmanned aircraft according to the embodiment. FIG. 6C is a diagram that illustrates a third scene in the first exemplary operation in the sound recording control performed by the unmanned aircraft according to the embodiment. Note that FIG. 6A to FIG. 6C are diagrams that illustrate operations performed by unmanned aircraft 100 in a top view.

As shown in FIG. 5, quality determiner 101b of unmanned aircraft 100 determines the quality of the target sound included in each of the four pieces of sound data generated by four microphones 105 when sound pickup processing unit 101a starts the sound recording control (S1). Sound pickup processing unit 101a starts sound recording when, for example, an operation signal received from controller 200 includes a signal indicating that sound recording is to start.

Next, quality determiner 101b determines whether to change the attitude of unmanned aircraft 100, in accordance with the determined quality of the target sounds (S2). More specifically, when determining that the quality of all of the target sounds is low, quality determiner 101b determines that the attitude of unmanned aircraft 100 is to be changed (Yes in step S2), and goes on to step S3. When determining that the quality of any one of the target sounds is high, quality determiner 101b determines that the attitude of unmanned aircraft 100 is to be maintained without change (No in step S2), and goes on to step S7.

For example, when none of sound pickup areas A1 through A4 of four microphones 105 of unmanned aircraft 100 faces the direction toward sound source 400, as shown in FIG. 6A, the ratio of noise picked up from generators 110 of unmanned aircraft 100 becomes large, and thus the quality of all the target sounds are determined as being low.

Sound source identifier 101c identifies the sound source direction, which is a direction from unnamed aircraft 100 to the sound source of the target sound, by use of the sound data generated by each of four microphones 105 (S3). Through this process, the sound source direction is identified as, for example, shown by a hollow arrow illustrated in FIG. 6B.

Subsequently, quality determiner 101b compares the sound source direction identified by sound source identifier 101c with four sound pickup areas A1 through A4 of four microphones 105 (S4). Through this process, quality determiner 101b identifies, for example, that the identified sound source direction shown in FIG. 6B is closest to sound pickup area A1 among four sound pickup areas A1 through A4.

Next, quality determiner 101b determines an amount of change required to change the attitude of unmanned aircraft 100 in order to include the sound source direction identified by sound source identifier 101c within identified sound pickup area A1 (S5). In so doing, quality determiner 101b determines a direction of rotation in which the attitude of unmanned aircraft 100 is to be changed, together with the amount of change.

Then, flight controller 101e rotates unmanned aircraft 100 in accordance with the amount of change and direction of rotation determined by quality determiner 101b, thereby changing the attitude of unmanned aircraft 100 (56). More specifically, flight controller 101e changes the rotational speeds of actuators 112 of four generators 110 to change the attitude of unmanned aircraft 100 in accordance with the determined amount of change and direction of rotation. Through this process, as shown in FIG. 6C, for example, the aircraft state of unmanned aircraft 100 is controlled in order to include the sound source direction within sound pickup area A1, as a result of which unmanned aircraft 100 rotates clockwise. Note that flight controller 101e is simply required to rotate unmanned aircraft 100 at the minimum amount of rotation that enables the inclusion of sound pickup area A1 within the sound source direction, and thus not required to align the sound source direction at the center of sound pickup area A1. Stated differently, flight controller 101e is simply required to rotate unmanned aircraft 100 so that an end part of sound pickup area A1 at the sound source direction side is oriented to face the sound source direction.

Sound pickup processing unit 101a determines whether to stop the sound recording (S7). When determining that the sound recording is to be stopped (Yes in S7), sound pickup processing unit 101a stops the sound recording control. When sound pickup processing unit 101a determines that the sound recording is not to be stopped (No in S7), quality determiner 101b makes the same determination made in step S1 again.

Sound pickup processing unit 101a determines that the sound recording is to be stopped when, for example, the operation signal received from controller 200 includes a signal indicating that the sound recording is to stop, and determines that the sound recording is to continue without stopping when, for example, the operation signal does not include a signal indicating that the sound recording is to stop.

Instead of the first exemplary operation, the second exemplary operation described below may be performed in the sound recording control of the unmanned aircraft.

Figure 7:
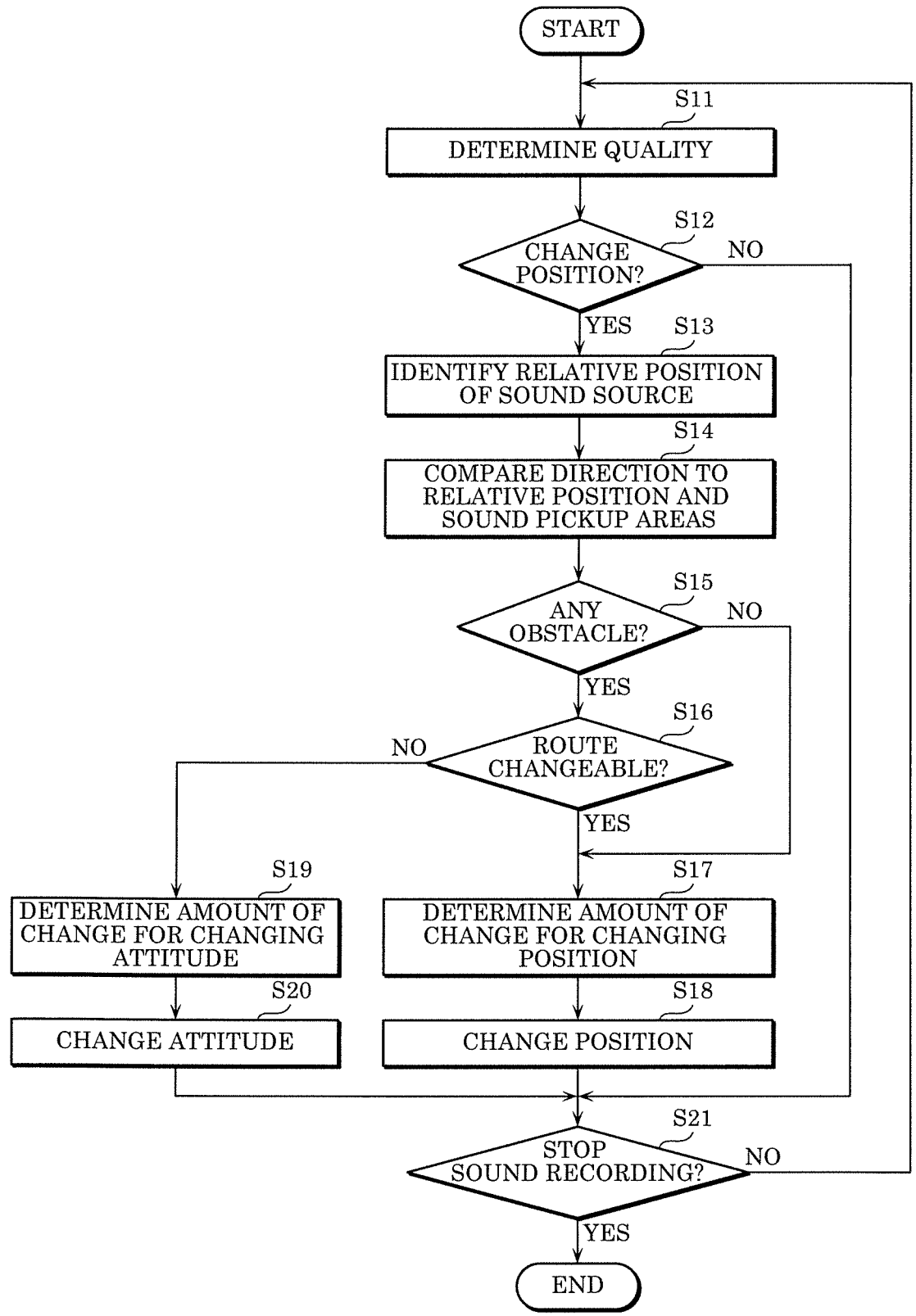
FIG. 7 is a flowchart of a second exemplary operation in the sound recording control performed by the unmanned aircraft according to an embodiment of the present disclosure.
Figure 8A:
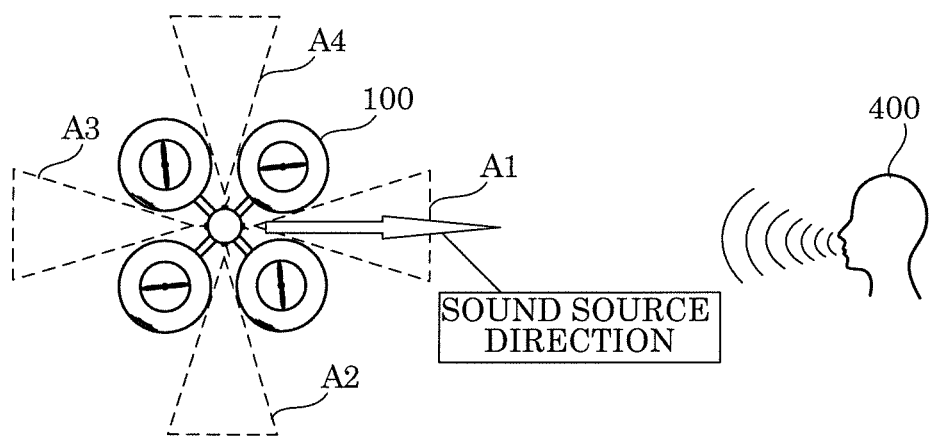
FIG. 8A is a diagram that illustrates a first scene in the second exemplary operation in the sound recording control performed by the unmanned aircraft according to an embodiment of the present disclosure.
Figure 8B:
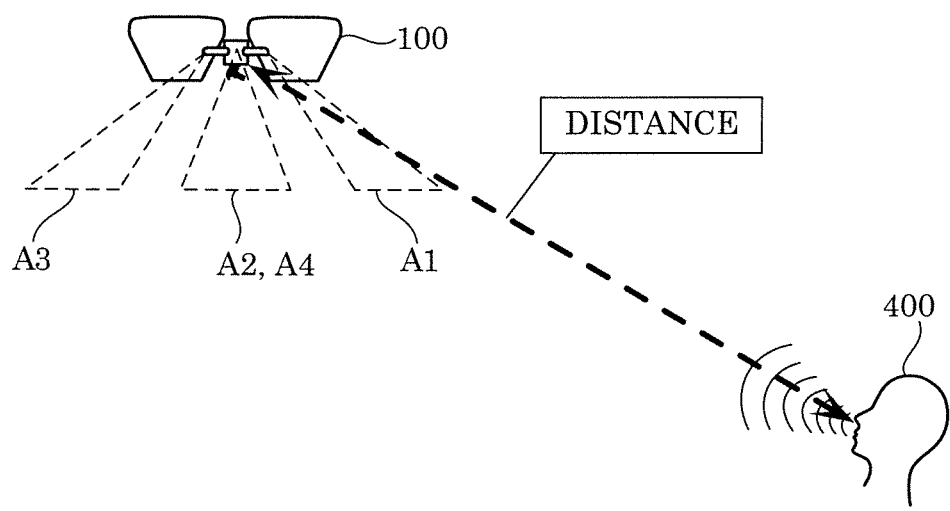
FIG. 8B is a diagram that illustrates a second scene in the second exemplary operation in the sound recording control performed by the unmanned aircraft according to an embodiment of the present disclosure.
Figure 8C:
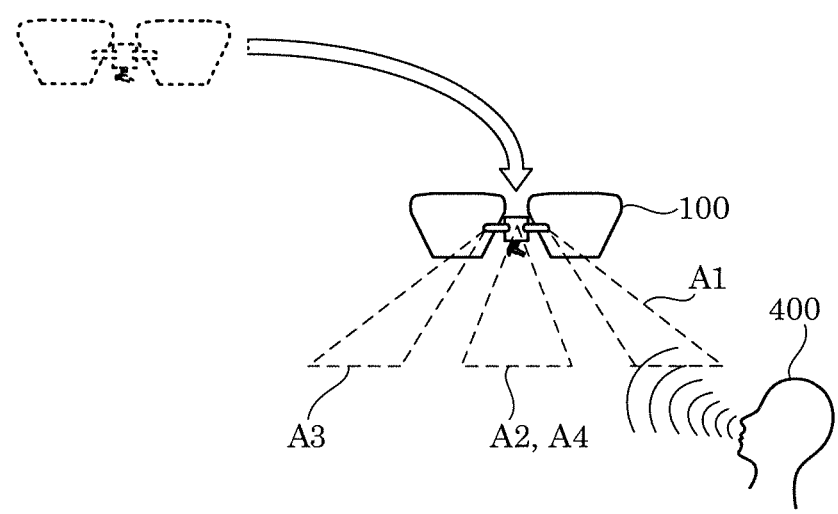
FIG. 8C is a diagram that illustrates a third scene in the second exemplary operation in the sound recording control performed by the unmanned aircraft according to an embodiment of the present disclosure.

FIG. 7 is a flowchart of the second exemplary operation in the sound recording control performed by the unmanned aircraft according to the embodiment. FIG. 8A is a diagram that illustrates a first scene in the second exemplary operation in the sound recording control performed by the unmanned aircraft according to the embodiment. FIG. 8B is a diagram that illustrates a second scene in the second exemplary operation in the sound recording control performed by the unmanned aircraft according to the embodiment. FIG. 8C is a diagram that illustrates a third scene in the second exemplary operation in the sound recording control performed by the unmanned aircraft according to the embodiment. Note that FIG. 8A to FIG. 8C are diagrams that illustrate operations performed by unmanned aircraft 100 in a top view.

As shown in FIG. 7, quality determiner 101b of unmanned aircraft 100 determines the quality of the target sound included in each of the four pieces of sound data generated by four microphones 105 when sound pickup processing unit 101a starts the sound recording control (S11). Sound pickup processing unit 101a starts sound recording when, for example, an operation signal received from controller 200 includes a signal indicating that sound recording is to start.

Next, quality determiner 101b determines whether to change the position of unmanned aircraft 100, in accordance with the determined quality of the target sounds (S12). More specifically, when determining that the quality of all of the target sounds is low, quality determiner 101b determines that the position of unmanned aircraft 100 is to be changed (Yes in step S12), and goes on to step S13. When determining that the quality of any one of the target sounds is high, quality determiner 101b determines that the position of unmanned aircraft 100 is to be maintained without change (No in step S12), and goes on to step S21.

Sound source identifier 101c identifies a relative position that includes the sound source direction, which is a direction from unnamed aircraft 100 to the sound source of the target sound, and the distance to the sound source, by use of the sound data generated by each of four microphones 105, or the image data generated by the image sensor of camera 107 (S13). Through this process, for example, the sound source direction is identified as shown by a hollow arrow illustrated in FIG. 8A, and the distance to sound source 400 is identified as shown by a broken line arrow illustrated in FIG. 8B. Note that the distance to sound source 400 is a distance on a three-dimensional space.

Subsequently, quality determiner 101b compares the relative position, identified by sound source identifier 101c, including the sound source direction and the distance to sound source 400 with four sound pickup areas A1 through A4 of four microphones 105 (S14). Through this process, quality determiner 101b determines, for example, that the identified sound source direction shown in FIG. 8B is included in sound pickup area A1 among four sound pickup areas A1 through A4, and that unmanned aircraft 100 is at the position that is away from sound source 400 by the distance that exceeds a predetermined distance range. Note that the predetermined distance range may be set in accordance with the extent to which four sound pickup areas A1 through A4 are distanced from unmanned aircraft 100.

Next, obstacle detector 101g determines whether any obstacle exists in the sound source direction when unmanned aircraft 100 travels by the distance to the identified sound source 400 (S15). More specifically, obstacle detector 101g determines whether any obstacle exists between unmanned aircraft 100 and sound source 400, in accordance with the distance, detected by distance sensor 108, from unmanned aircraft 100 to the object.

When determining that an obstacle exists (Yes in S15), obstacle detector 101g determines whether the route of unmanned aircraft 100 to sound source 400 is changeable (S16).

When obstacle detector 101g determines that no obstacle exists (No in S15) or determines that the route is changeable (Yes in S16), quality determiner 101b determines an amount of change required to change the position of unmanned aircraft 100 in order to include sound source 400 within sound pickup area A1 in the shortest travel distance, in accordance with the route of unmanned aircraft 100 (S17).

Then, flight controller 101e causes unnamed aircraft 100 to travel in accordance with the determined amount of change required to change the position, thereby changing the position of unmanned aircraft 100 (S18). Through these processes, for example, unmanned aircraft 100 is moved to the position at which sound pickup area A1 includes sound source 400, as shown in FIG. 8C.

When obstacle detector 101g determines that the route is unchangeable (No in S16), quality determiner 101b determines an amount of change required to change the attitude of unmanned aircraft 100 (S19). As in the case shown in FIG. 8A, for example, the sound source direction is included in sound pickup area A1, and thus the amount of change required to change the attitude is determined to be zero. Note that when the sound source direction is included in none of sound pickup areas A1 through A4 as shown in FIG. 6A, for example, an amount of change required to change the attitude of unmanned aircraft 100 and a direction of rotation in which the attitude of unmanned aircraft 100 is to be changed are determined as in step S5 in the first exemplary operation.

Then, flight controller 101e rotates unmanned aircraft 100 in accordance with the determined amount of change and direction of rotation required to change the attitude of unmanned aircraft 100, thereby changing the attitude of unmanned aircraft 100 (S20).

Sound pickup processing unit 101a determines whether to stop the sound recording (S21). When determining that the sound recording is to be stopped (Yes in S21), sound pickup processing unit 101a stops the sound recording control. When sound pickup processing unit 101a determines that the sound recording is not to be stopped (No in S21), quality determiner 101b makes the same determination made in step S11 again.

Figure 9:
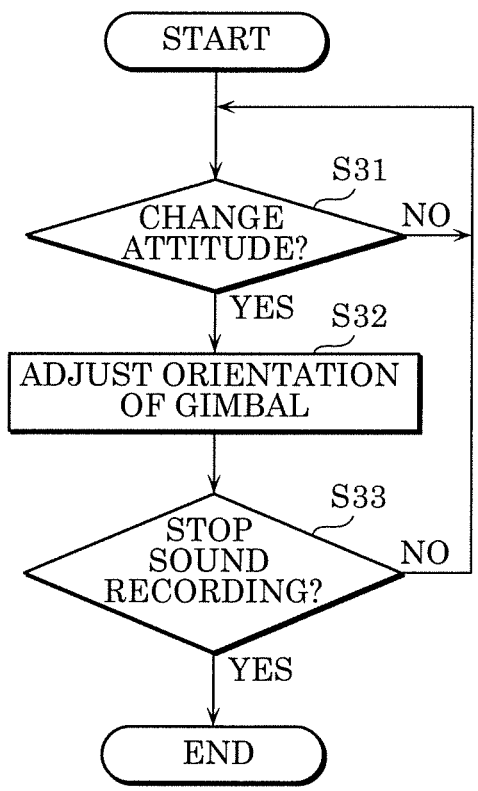
FIG. 9 is a flowchart of a first exemplary operation of control of adjusting the imaging direction of a camera in the sound recording control performed by the unmanned aircraft according to an embodiment of the present disclosure.

FIG. 9 is a flowchart of a first exemplary operation of control of adjusting the imaging direction of the camera in the sound recording control performed by the unmanned aircraft according to the embodiment. The control of adjusting the imaging direction of camera 107 starts upon the start of the sound recording control.

As shown in FIG. 9, video controller 101f of unmanned aircraft 100 determines whether the attitude of unmanned aircraft 100 is to be changed (S31).

When determining that the attitude of unmanned aircraft 100 is to be changed (Yes in S31), video controller 101f controls the orientation of gimbal 106 in accordance with the change in the attitude of unmanned aircraft 100 (S32). More specifically, video controller 101f rotates gimbal 106 in the direction that is opposite to the direction in which unmanned aircraft 100 rotates, at the rotational speed at which unmanned aircraft 100 rotates. Through this process, video controller 101f maintains the imaging direction of camera 107 to a constant orientation even before and after the change in the attitude of unmanned aircraft 100.

Video controller 101f determines whether to stop the sound recording (S33). When determining that the sound recording is to stop (Yes in S33), video controller 101f stops controlling gimbal 106. When determining that the attitude of unmanned aircraft 100 is not to be changed (No in S31) or that the sound recording is not to stop (No in S33), video controller 101f makes that same determination made in step S31 again.

The control in a second exemplary operation described below may be performed as the control of adjusting the imaging direction of camera 107, together with the control in the first exemplary operation.

Figure 10:
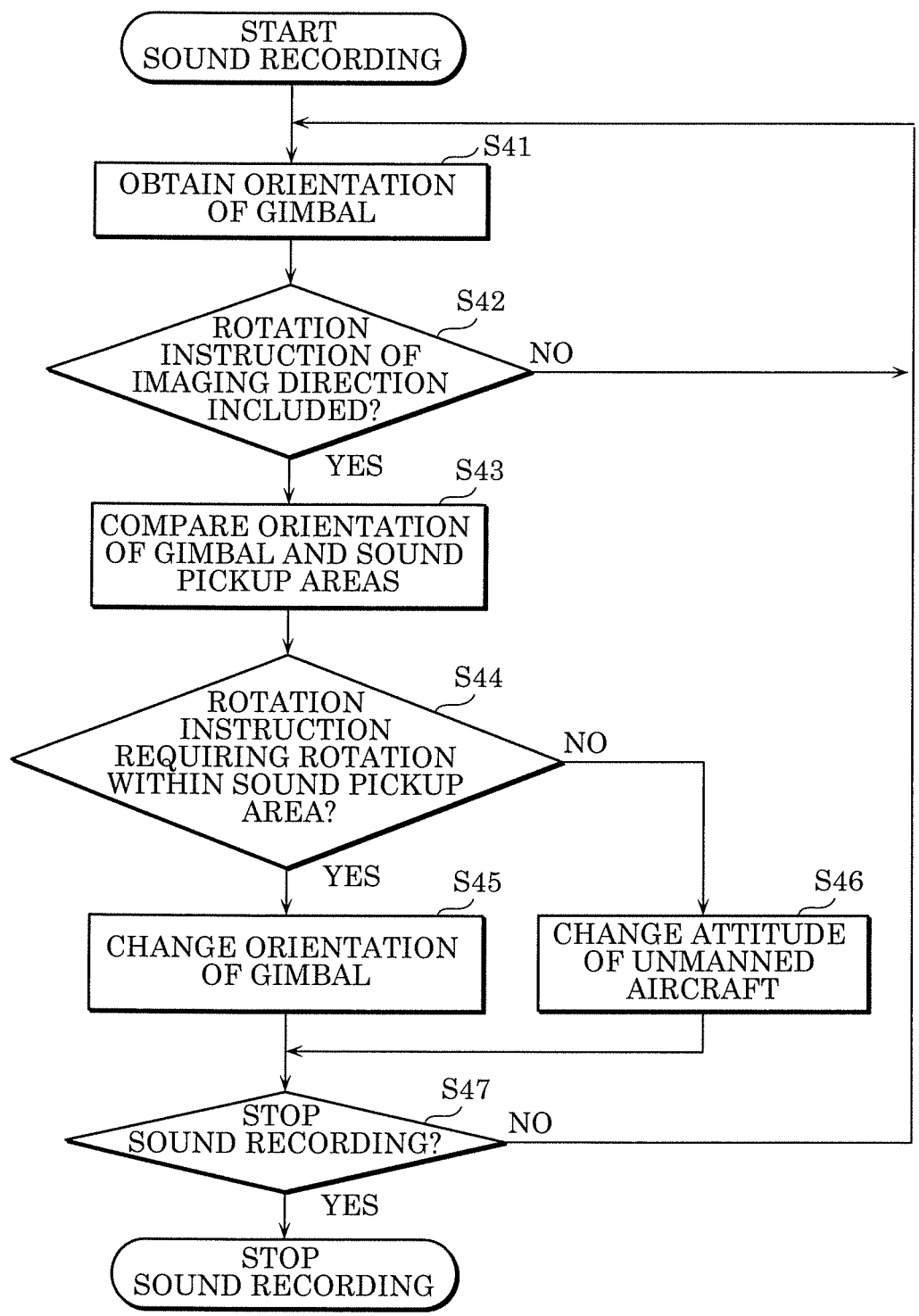
FIG. 10 is a flowchart of a second exemplary operation of control of adjusting the imaging direction of the camera in the sound recording control performed by the unmanned aircraft according to an embodiment of the present disclosure.
Figure 11A:
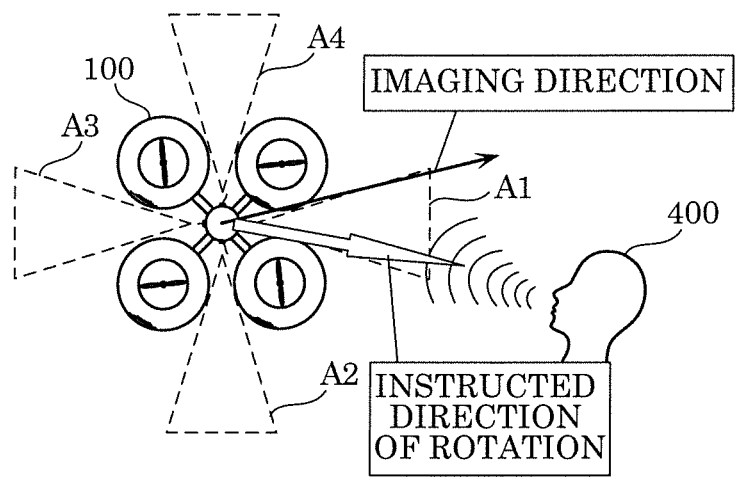
FIG. 11A is a diagram that illustrates a first scene in the second exemplary operation of control of adjusting the imaging direction of the camera included in the unmanned aircraft according to an embodiment of the present disclosure.
Figure 11B:
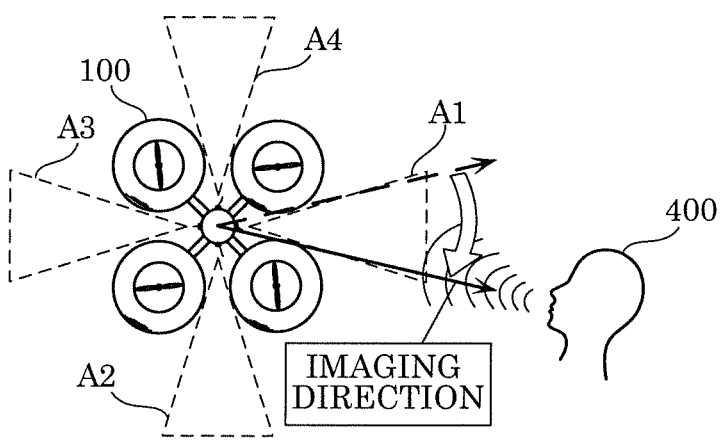
FIG. 11B is a diagram that illustrates a second scene in the second exemplary operation of control of adjusting the imaging direction of the camera included in the unmanned aircraft according to an embodiment of the present disclosure.
Figure 12A:
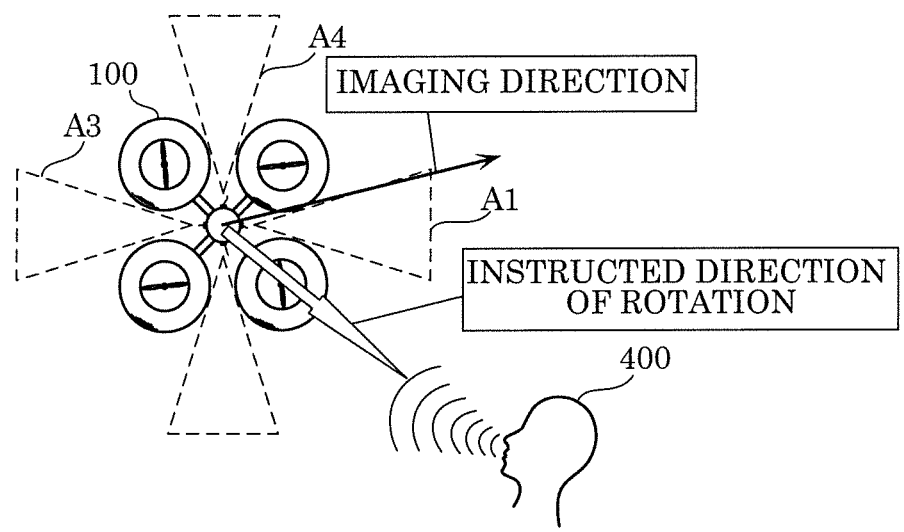
FIG. 12A is a diagram that illustrates the first scene in the second exemplary operation of control of adjusting the imaging direction of the camera included in the unmanned aircraft according to an embodiment of the present disclosure.
Figure 12B:
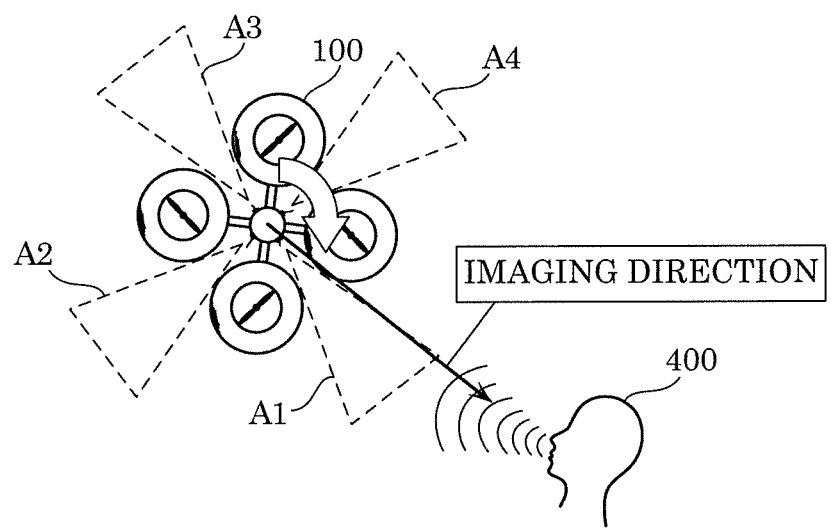
FIG. 12B is a diagram that illustrates the second scene in the second exemplary operation of control of adjusting the imaging direction of the camera included in the unmanned aircraft according to an embodiment of the present disclosure.

FIG. 10 is a flowchart of a second exemplary operation of control of adjusting the imaging direction of the camera in the sound recording control performed by the unmanned aircraft according to the embodiment. FIG. 11A is a diagram that illustrates a first scene in the second exemplary operation of control of adjusting the imaging direction of the camera included in the unmanned aircraft according to the embodiment. FIG. 11B is a diagram that illustrates a second scene in the second exemplary operation of control of adjusting the imaging direction of the camera included in the unmanned aircraft according to the embodiment. FIG. 12A is a diagram that illustrates the first scene in the second exemplary operation of control of adjusting the imaging direction of the camera included in the unmanned aircraft according to the embodiment. FIG. 12B is a diagram that illustrates the second scene in the second exemplary operation of control of adjusting the imaging direction of the camera included in the unmanned aircraft according to the embodiment. Note that FIG. 11A, FIG. 11B, FIG. 12A, and FIG. 12B are diagrams that illustrate operations performed by unmanned aircraft 100 in a top view.

As shown in FIG. 10, video controller 101f of unmanned aircraft 100 obtains the orientation of gimbal 106 (S41).

Through this process, video controller 101*f* obtains the imaging direction of camera 107 that is based on the orientation of gimbal 106.

Video controller 101*f* then determines whether the operation signal received by communication IF 109 includes an operation signal indicating rotation instruction to rotate the imaging direction of camera 107 (S42).

When determining that the operation signal indicating rotation instruction to rotate the imaging direction of camera 107 is included (Yes in S42), quality determiner 101*b* compares the obtained orientation of gimbal 106 with sound pickup areas A1 through A4 of four microphones 105 (S43).

Quality determiner 101*b* determines whether the rotation of the imaging direction of camera 107 in accordance with the rotation instruction is a rotation within a sound pickup area that includes the current imaging direction of camera 107 (S44).

When the rotation of the imaging direction of camera 107 in accordance with the rotation instruction is determined as being a rotation within the sound pickup area that includes the current imaging direction of camera 107 (Yes in S44), video controller 101*f* changes the orientation of gimmal 106 in accordance with the direction of rotation and the rotational speed in accordance with the rotation instruction, thereby changing the imaging angle of camera 107 (S45). When this is done, flight controller 101*e* does not perform control of changing the attitude of unmanned aircraft 100. For example, as shown in FIG. 11A, when the imaging direction of camera 107 is within sound pickup area A1 and the instructed direction of rotation in accordance with the rotation instruction is within sound pickup area A1, unmanned aircraft 100 changes the imaging direction of camera 107 by changing the orientation of gimbal 106 without changing the attitude of unmanned aircraft 100 as shown in FIG. 11B.

Note that video controller 101*f* may change the imaging direction of camera 107 by changing the orientation of gimbal 106 without changing the attitude of unmanned aircraft 100 in accordance with the direction of rotation and the rotational speed indicated by the rotation instruction as described above, when none of sound pickup areas A1 through A4 includes the imaging direction of camera 107 that is based on the orientation of gimbal 106 obtained in step S41, but when the rotation of the imaging direction of camera 107 in accordance with the rotation instruction is a rotation to within a sound pickup area that includes the current imaging direction of camera 107.

Meanwhile, when the rotation of the imaging direction of camera 107 in accordance with the rotation instruction is determined as a rotation to outside of the sound pickup area that includes the current imaging direction of camera 107 (No in S44), flight controller 101*e* rotates unmanned aircraft 100 in accordance with the direction of rotation and the rotational speed in accordance with the rotation instruction, thereby changing the attitude of unmanned aircraft 100 (S46). When this is done, video controller 101*f* does not perform control of changing the orientation of gimbal 106. For example, as shown in FIG. 12A, when the imaging direction of camera 107 is within sound pickup area A1 and the instructed direction of rotation in accordance with the rotation instruction is outside of sound pickup area A1, the attitude of unmanned aircraft 100 is changed with the orientation of gimbal 106 unchanged as shown in FIG. 12B.

Note that flight controller 101*e* and video controller 101*f* may rotate unmanned aircraft 100 in the direction of rotation in accordance with the rotation instruction in order to include the sound source direction within one of the four sound pickup areas A1 thorough A4 that is closest to the sound source direction and may rotate at the same time the orientation of gimbal 106 in the same direction as the direction of rotation of unmanned aircraft 100, when none of sound pickup areas A1 through A4 includes the imaging direction of camera 107 that is based on the orientation of gimbal 106 obtained in step S41, but when the rotation of the imaging direction of camera 107 in accordance with the rotation instruction is a rotation to outside of the sound pickup area that includes the current imaging direction of camera 107. More specifically, flight controller 101*e* and video controller 101*f* change the attitude of unmanned aircraft 100 and the orientation of gimbal 106 so that the total of the rotational speed required to rotate unmanned aircraft 100 and the rotational speed required to rotate the orientation of gimbal 106 amounts to the rotational speed that is in accordance with the rotation instruction.

Video controller 101*f* determines whether to stop the sound recording after step S45 or step S46 (S47). When determining that the sound recording is to stop (Yes in S47), video controller 101*f* stops controlling gimbal 106. When determining that an operation signal indicating a rotation instruction to rotate the imaging direction of camera 107 is not included (No in S42), or when determining that the sound recording is not to stop (No in S47), video controller 101*f* performs the same process performed in step S41 again.

3. Effects, etc.

In unmanned aircraft 100 according to the present embodiment, processor 101 determines the quality of a target sound by use of the sound data generated by microphone 105. Processor 101 identifies a sound source direction from unmanned aircraft 100 to the sound source of the target sound by use of the sound data generated by microphone 105 or image data generated by the image sensor of camera 107. Processor 101 controls an unmanned aircraft state that is a state of the unmanned aircraft such that a direction of a sound pickup area is aligned with the sound source direction, in accordance with the determined quality. Unmanned aircraft state includes, but is not limited to, position or altitude. The sound pickup area is a range in which sound pickup quality of microphone 105 is higher than that of another area.

In this configuration, processor 101 controls the aircraft state of unmanned aircraft 100 in order to include the sound source direction within the sound pickup area of microphone 105. This configuration thus achieves a relatively larger component of the target sound of the sound data generated by microphone 105, and enhances the quality of the target sound.

In unmanned aircraft 100, processor 101 varies the level of changes in the unmanned aircraft state in order to perform the sound recording. Stated differently, processor 101 changes the aircraft state of the unmanned aircraft with the least possible amount of change, and thus reduces the noise from the unmanned aircraft caused by the control of the aircraft state. For example, since the aircraft state of unmanned aircraft 100 is changed with the minimum amount of change, the above configuration minimizes the length of time required to change the rotational speeds of rotor blades 111 included in unmanned aircraft 100, or the amount of change required to change the rotational speeds of rotor blades 111. This configuration is thus capable of reducing the noise that is produced until when the sound source direction is included within the sound pickup area in which the sound pickup quality of the microphone is higher than that of another area. Also, a minimized change in the rotational speeds achieves a smaller change in noise characteristics. Consequently, the accuracy of noise removal processing is improved. That the noise is hard to be picked up and easy to be removed results in an enhanced quality of the target sound.

In unmanned aircraft 100, processor 101 identifies the sound source direction by use of the sound data generated by microphone 105. This configuration enables unmanned aircraft 100 to identify the sound source direction only by being equipped with microphone 105 as a sensor.

In unmanned aircraft 100, processor 101 identifies the sound source direction by use of the image data generated by the image sensor. This configuration enables unmanned aircraft 100 to identify the sound source direction without being affected by the surrounding noise.

In unmanned aircraft 100, processor 101 modifies the unmanned aircraft state when the determined quality is lower than a threshold. This configuration improves the quality of the target sound when the quality of the obtained target sound is low.

In unmanned aircraft 100, processor 101 maintains the unmanned aircraft state when the determined quality is higher than a threshold. Stated differently, processor 101 does not change the aircraft state of unmanned aircraft 100 when the quality of the target sound is sufficiently high. This configuration thus prevents the reduction in the quality of the target sound caused by the noise that is produced due to the change in the aircraft state of unmanned aircraft 100 or by the change in the noise characteristics.

4. Variation 4-1. Variation 1

In the above description, processor 101 of unmanned aircraft 100 according to the embodiment identifies the sound source direction, and controls the aircraft state of unmanned aircraft 100 in order to include such sound source direction within a sound pickup area of microphone 105, but the present disclosure is not limited to this example. Processor 101 may alternatively control the aircraft state of unmanned aircraft 100 in order to, for example, include the imaging direction of the image sensor of camera 107 within sound pickup area of microphone 105.

Figure 13:
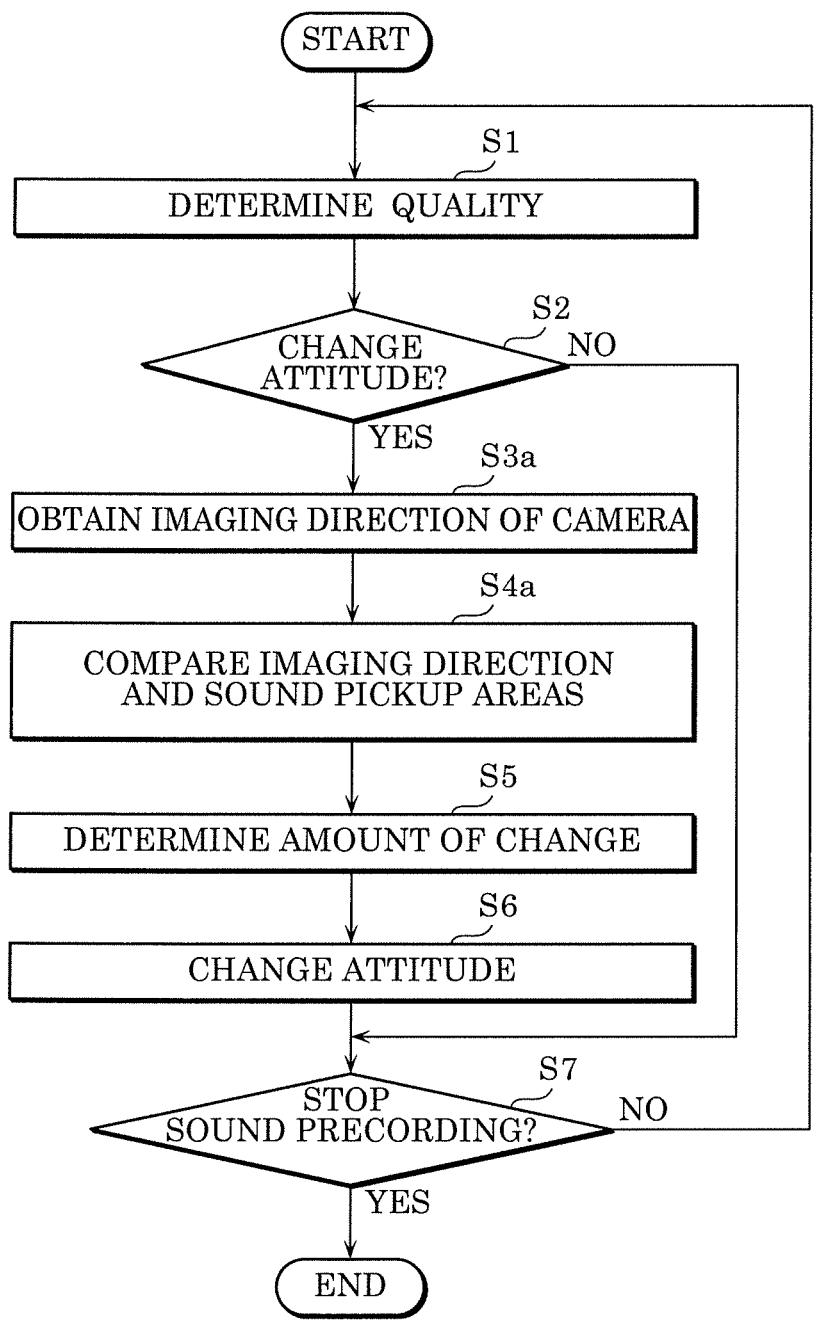
FIG. 13 is a flowchart of an exemplary operation in the sound recording control performed by the unmanned aircraft according to Variation 1 of the present disclosure.

FIG. 13 is a flowchart of an exemplary operation in sound recording control performed by the unmanned aircraft according to Variation 1.

The sound recording control according to Variation 1 is different from the first exemplary operation in the sound recording control performed by unmanned aircraft 100 according to the embodiment in that step S3a and step S4a are performed instead of step S3 and step S4 of the first exemplary operation. The following thus describes step S3a and step S4a, and omits the description of the other processes.

When the determination result is "Yes" in step S2, video controller 101f of unmanned aircraft 100 obtains the orientation of gimbal 106 (S3a). Through this process, video controller 101f obtains the imaging direction of camera 107 that is based on the orientation of gimbal 106.

Next, quality determiner 101b compares the imaging direction of camera 107 obtained by video controller 101f with four sound pickup areas A1 through A4 of four microphones 105 (S4a).

Subsequently, step S5 through step S7 in the first exemplary operation in the sound recording control of unmanned aircraft 100 according to the embodiment will be performed.

Processor 101 of unmanned aircraft 100 according to Variation 1 estimates that the sound source of the target sound is located in the imaging direction of camera 107, and controls the aircraft state of unmanned aircraft 100 accordingly, thereby including the imaging direction within a sound pickup area of microphone 105. In many cases, the imaging direction is in the direction in which the sound source of the target sound is located. This achieves a relatively greater component of the target sound of the sound data generated by microphones 105, and thus enhanced quality of the target sound.

4-2. Variation 2

Unmanned aircraft 100 according to the above-described embodiment includes four generators 110, but the number of generators included in unmanned aircraft 100 is not limited to four, and thus may be one to three, or five or more.

4-3. Variation 3

Unmanned aircraft 100 according to the above-described embodiment includes four ducts 130 and main body 140 that are connected by four arms 141 as a non-limited example, and thus four ducts 130 or four arms 141 may not be included so long as four generators 140 are connected to main body 140. Stated differently, in the unmanned aircraft, main body 140 may be directly connected to four generators 110, or may be directly connected to four ducts 140. Also, the unmanned aircraft may not include four ducts 130, or more specifically, the lateral sides of four generators 110 may not be covered.

4-4. Variation 4

Unmanned aircraft 100 according to the above-described embodiment includes four microphones 105, but the number of microphones included in unmanned aircraft 100 is not limited to four, and thus may be one to three, or five or more. When unmanned aircraft 100 includes a small number of microphones 105, the sound source direction may be estimated by rotating the attitude of unmanned aircraft 100 to obtain plural pieces of sound data at different timings and compare such pieces of sound data. Microphones 105 are simply required to be arranged on the outer side of unmanned aircraft 100, or more specifically, exposed to an exterior space, and thus may be arranged on a side of arms 141 other than on a side of main body 140. Alternatively, microphones 105 may be arranged away from main body 140. For example, microphones 105 may be arranged at ends or in the middle of stick-like arms, lines like metallic wires, or ropes like threads that are provided to main body 140 in addition to arms 141 and that extend in a direction away from main body 140.

4-5. Variation 5

Unmanned aircraft 100 according to the above-described embodiment is rotated at the minimum rotation angle or moved in the minimum distance of travel in order to include a previously identified sound source direction within one of sound pickup areas A1 through A4. The present disclosure, however, is not limited to this example, and thus unmanned aircraft 100 may be rotated in order to include the sound source direction within one of sound pickup areas A1 through A4 by changing the attitude of unmanned aircraft 100, with the quality determined by quality determiner 101b being fed back until such quality exceeds the threshold.

4-6. Variation 6

Unmanned aircraft 100 according to the above-described embodiment starts sound recording when an operation signal received from controller 200 includes a signal indicating that sound recording is to start as a non-limited example. Unmanned aircraft 100 may thus start sound recording, for example, when: the sound data obtained by sound pickup processing unit 101a includes a sound recording command indicating that sound recording is to start; when a user's gesture indicating that sound recording should start has been recognized from the analysis of the image data obtained by camera 107; or when a user's lip movement to utter words, such as a keyword, indicating that sound recording should start has been recognized.

Also, unmanned aircraft 100 may autonomously fly in accordance with a previously set program without being operated by controller 200.

Controller 200 operates unmanned aircraft 100 in accordance with a previously set program without having an interface for operating unmanned aircraft 100.

Moreover, in the above embodiment and variations, the structural components may be implemented as dedicated hardware or may be implemented by executing a software program suited to such structural components. Alternatively, the structural components may be implemented by a program executor such as a CPU and a processor reading out and executing the software program recorded in a recording medium such as a hard disk and a semiconductor memory. Here, the software program that enables unmanned aircraft 100 and the information processing method, etc. according to the embodiment is as described below.

Stated differently, such program causes a computer to execute an information processing method performed by a processor in an unmanned aircraft that includes the processor and a sensor including at least a microphone that generates sound data. Such information processing method includes: determining quality of a target sound by use of the sound data generated by the microphone; identifying a sound source direction from the unmanned aircraft to a sound source of the target sound by use of data generated by the sensor; and controlling an aircraft state that is a state of the unmanned aircraft such that a direction of a sound pickup area is aligned with the sound source direction, in accordance with the determined quality. Unmanned aircraft state includes, but is not limited to, position or altitude. The sound pickup area is a range in which sound pickup quality of the microphone is higher than that of another area.

The unmanned aircraft, the information processing method, and the recording medium according to one or more aspects of the present disclosure have been described on the basis of the embodiment, but the present disclosure is not limited to the such embodiment. The range of one or more aspects of the present disclosure may include variations achieved by making various modifications and alternations to the present disclosure that can be conceived by those skilled in the art without departing from the essence of the present disclosure, and an embodiment achieved by any combination of structural components described in the present specification.

Note that machine learning may be utilized for processes performed by quality determiner 101b, sound source identifier 101c, obstacle detector 101g, and flight controller 101e, and for image recognition processing and sound recognition processing. Examples of machine learning include: supervised learning in which an input-output relationship is studied by use of teaching data, which is input information labeled with output information; unsupervised learning in which data structure is built up only from an unlabeled input; semi-supervised learning in which both labeled and unlabeled data are utilized; and reinforcement learning in which feedback (reward) is obtained to an action selected from the result of state observation to study successive actions that enable the obtainment the maximum amount of reward. More specific techniques of machine learning include neural-network learning (including deep learning that utilizes multi-layered neural network), genetic programming, decision tree learning, Bayesian network learning, and support vector machine (SVM) learning. The present disclosure uses one of these example techniques.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable for use as an unmanned aircraft, an information processing method, a recording medium, etc. capable of enhancing the quality of the target sound.

What is claimed is:

1. An unmanned aircraft, comprising:
 a sensor that includes at least a microphone that generates sound data;
 at least one rotor blade; and
 a processor,
 wherein the processor:
 determines quality of a target sound by use of the sound data generated by the microphone;
 identifies a sound source direction from the unmanned aircraft to a sound source of the target sound by use of data generated by the sensor;
 controls an unmanned aircraft state that is a state of the unmanned aircraft such that a direction of a sound pickup area is aligned with the sound source direction, in accordance with the determined quality, the sound pickup area being a range in which sound pickup quality of the microphone is higher than that of another area; and
 controls the unmanned aircraft state such that a change in a rotational speed of the at least one rotor blade included in the unmanned aircraft is minimized.

2. The unmanned aircraft according to claim 1, wherein the processor controls the unmanned aircraft state such that a change in unmanned aircraft states is minimized.

3. The unmanned aircraft according to claim 2, wherein the processor controls the unmanned aircraft state such that noise from the unmanned aircraft due to the change is minimized.

4. The unmanned aircraft according to claim 1, wherein the processor identifies the sound source direction by use of the sound data generated by the microphone.

5. The unmanned aircraft according to claim 1, wherein the sensor further includes an image sensor that generates image data, and the processor identifies the sound source direction by use of the image data generated by the image sensor.

6. The unmanned aircraft according to claim 1, wherein the processor modifies the unmanned aircraft state when the determined quality is lower than a threshold.

7. The unmanned aircraft according to claim 1, wherein the processor maintains the unmanned aircraft state when the determined quality is higher than a threshold.

8. An unmanned aircraft, comprising:
 a sensor that includes at least a microphone that generates sound data and an image sensor; and a processor,
wherein a sound pickup direction of the microphone is fixed relative to the unmanned aircraft, a range in a direction in which sound pickup quality of the microphone is higher than in a range in another direction is fixed as a sound pickup characteristic, and the image sensor is rotatably fixed to the unmanned aircraft, and
the processor:
determines quality of a target sound by use of the sound data generated by the microphone; and
controls an unmanned aircraft state that is a state of the unmanned aircraft such that the sound pickup direction is aligned with an imaging direction of the image sensor, in accordance with the determined quality, the sound pickup quality being the sound pickup characteristic of the microphone.

9. An information processing method performed by a processor in an unmanned aircraft that includes the processor, at least one rotor blade, and a sensor including at least a microphone that generates sound data, the information processing method comprising:
determining quality of a target sound by use of the sound data generated by the microphone;
identifying a sound source direction from the unmanned aircraft to a sound source of the target sound by use of data generated by the sensor;
controlling an unmanned aircraft state that is a state of the unmanned aircraft such that a direction of a sound pickup area is aligned with the sound source direction, in accordance with the determined quality, the sound pickup area being a range in which sound pickup quality of the microphone is higher than that of another area; and
controlling the unmanned aircraft state such that a change in a rotational speed of the at least one rotor blade included in the unmanned aircraft is minimized.

10. A non-transitory computer-readable recording medium for use by a processor in an unmanned aircraft that includes the processor, at least one rotor blade, and a sensor including at least a microphone that generates sound data, the recording medium having a computer program recorded thereon for causing the processor to execute an information processing method including:
determining quality of a target sound by use of the sound data generated by the microphone;
identifying a sound source direction from the unmanned aircraft to a sound source of the target sound by use of data generated by the sensor;
controlling an unmanned aircraft state that is a state of the unmanned aircraft such that a direction of a sound pickup area is aligned with the sound source direction, in accordance with the determined quality, the sound pickup area being a range in which sound pickup quality of the microphone is higher than that of another area; and
controlling the unmanned aircraft state such that a change in a rotational speed of the at least one rotor blade included in the unmanned aircraft is minimized.

* * * * *